United States Patent [19]

McFarland

[11] 3,926,992
[45] Dec. 16, 1975

[54] ALDOL PRODUCTS OF 2-QUINOXALINECARBOXALDEHYDE-1,4-DIOXIDES

[75] Inventor: James W. McFarland, Lyme, Conn.

[73] Assignee: Pfizer Inc., New York, N.Y.

[22] Filed: Nov. 3, 1972

[21] Appl. No.: 303,490

[52] U.S. Cl........ 260/250 QN; 260/307 G; 424/250
[51] Int. Cl.$^2$........................................ C07D 241/52
[58] Field of Search.................. 260/250 QN, 250 Q

[56] References Cited
UNITED STATES PATENTS

| | | | |
|---|---|---|---|
| 2,921,937 | 1/1960 | Gordon | 260/267 |
| 3,308,021 | 3/1967 | Slather | 260/250 QN |
| 3,344,022 | 9/1967 | Johnston | 167/53.1 |
| 3,366,628 | 1/1968 | Wendt | 260/211.5 |
| 3,660,398 | 5/1972 | Ley et al. | 260/250 QN |
| 3,679,679 | 4/1970 | Dominy | 260/250 R |
| 3,728,345 | 4/1973 | Cronin | 260/250 R |

FOREIGN PATENTS OR APPLICATIONS

| | | | |
|---|---|---|---|
| 1,293,850 | 10/1972 | United Kingdom | 260/250 QN |
| 1,215,815 | 12/1970 | United Kingdom | 260/250 R |
| 162,148 | 2/1963 | U.S.S.R. | 260/250 R |
| 697,976 | 11/1967 | Belgium | 260/250 R |
| 721,724 | 4/1969 | Belgium | 260/250 R |
| 721,725 | 4/1969 | Belgium | 260/250 R |
| 721,726 | 4/1969 | Belgium | 260/250 R |
| 721,728 | 4/1969 | Belgium | 260/250 R |
| 407,218 | 6/1967 | Australia | 260/250 QN |

OTHER PUBLICATIONS

Landquist, et al. J. Chem. Soc., 2052 (1956).
only pages 1 to 5-of Australian Patent 0,407,218 to Johnston cited.
Guthzeit, Chemical Abstract 4:901(6).
Volskova, Chemical Abstract 40:14538
Errede, Chemical Abstract 58:112436.
Grob, et al., Chemical Abstract 56:7288e.
Burgada, Chemical Abstract 59:15165c.
Chiodoni, Chemical Abstract 60:13178e.
Isagulyants, Chemical Abstract 61:2965d.
Osdene, et al., Chemical Abstract 65:12204g.

Primary Examiner—Donald G. Daus
Assistant Examiner—Mark L. Berch
Attorney, Agent, or Firm—Connolly and Hutz

[57] ABSTRACT

Antibacterial and animal growth promoting agents of the formula

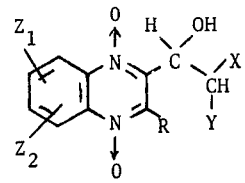

wherein R is hydrogen or methyl; X is CN, $COCH_3$, $CONR_1R_2$, $CONH(CH_2)_n$—$R_3$ or $COOR_4$; Y is hydrogen or X; $Z_1$ is a 6- or 7-position substituent and is H, $CH_3$, Cl, $OCH_3$, $SO_2NH_2$, $SO_2NH(CH_3)$ or $SO_2N(CH_3)_2$; $Z_2$ is a 7- or 6-position substituent and is H, Cl or $CH_3$, with the proviso that when $Z_2$ is Cl or $CH_3$, $Z_1$ is also Cl or $CH_3$; each of $R_1$, $R_2$ and $R_4$ is hydrogen, methyl or ethyl; $R_3$ is OH or $N(CH_3)_2$; $n$ is 2 or 3; and the pharmaceutically-acceptable salts thereof; i.e., alkali metal, ammonium and mine salts of those compounds wherein at least one of X or Y is COOH; and acid addition salts of those compounds wherein X is $CONH(CH_2)_n$—$N(CH_3)_2$.

10 Claims, No Drawings

ALDOL PRODUCTS OF 2-QUINOXALINECARBOXALDEHY-1,4-DIOXIDES

BACKGROUND OF THE INVENTION

This invention relates to novel aldol products of 2-quinoxaline-carboxaldehyde-1,4-dioxides which are useful as antibacterial agents and growth promotants.

The unceasing quest for antibacterial agents has resulted in the production of a wide variety of structural types of organic compounds, including many derivatives of quinoxaline-1,4-dioxides. Landquist et al., J. Chem. Soc. 2052 (1956), in a search for compounds of improved antibacterial and antiprotozoal activity, reported the preparation of several derivatives of 2-methyl- and 2,3-dimethylquinoxaline-1,4-dioxides.

Belgian Pat. No. 697,976, granted Nov. 3, 1967, describes preparation of a variety of N-substituted derivatives of 3-methyl-2-quinoxaline carboxamide-1,4-dioxide in which the N-substituent is phenyl, substituted phenyl, dodecyl or ethyl. Also disclosed are cyclic amides, e.g., pyrrolidide and piperidide. They are said to be of value as intermediates for the preparation of vegetation protection agents and pharmaceutical agents. Belgian Pat. Nos. 721,724; 721,725; 721,726; and 721,728, published April 2, 1969, describe a variety of N-substituted 3-methyl-2-quinoxalinecarboxamide-1,4-dioxide derivatives wherein the N-substituent is hydroxyalkyl, lower alkoxyalkyl, carbalkoxyalkyl, monoalkylaminoalkyl or di(alkyl)aminoalkyl which are useful as antibacterial agents.

U.S. Pat. No. 3,344,022, issued Sept. 26, 1967, describes a series of 2- and/or 3-α-hydroxyalkyl substituted quinoxaline-1,4-dioxides useful for the control of respiratory disease in poultry and for promotion of animal growth.

SUMMARY OF THE INVENTION

It has now been found that a novel series of aldol products of 2-quinoxalinecarboxaldehyde-1,4-dioxide are useful as antibacterial agents, animal growth promotants and for improving feed efficiency of animals. These novel compounds have the formula

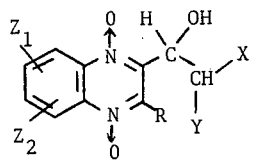

wherein R is selected from the group consisting of hydrogen and methyl; X is selected from the group consisting of -CN, -COCH$_3$, -CONR$_1$R$_2$, -CONH(CH$_2$)$_n$-R$_3$ and -COOR$_4$; Y is selected from the group consisting of hydrogen and X; each of R$_1$, R$_2$ and R$_4$ is selected from the group consisting of hydrogen, methyl and ethyl; R$_3$ is selected from the group consisting of -OH and -N(CH$_3$)$_2$; $n$ is 2 or 3; Z$_1$ is a 6- or 7-position substituent and is selected from the group consisting of H, Cl, -CH$_3$, -OCH$_3$, -SO$_2$NH$_2$, -SO$_2$NH(CH$_3$) and -SO$_2$N(CH$_3$)$_2$; Z$_2$ is a 7- or 6-position substituent and is selected from the group consisting H, -Cl and -CH$_3$; with the proviso that when Z$_2$ is -Cl or -CH$_3$, Z$_1$ is also -Cl or -CH$_3$; and when X and/or Y is -COOH, the non-toxic alkali metal, ammonium and amine salts thereof; and when R$_3$ is -N(CH$_3$)$_2$, the non-toxic acid addition salts thereof.

By "non-toxic" salts is meant those salts which do not cause a toxic reaction in an animal to which they are administered. The favored acid addition salts are the hydrochloride, hexafluorophosphate, citrate, tartrate and pamoate. The metal and amine salts of particular interest are the sodium, potassium and piperidine salts.

DETAILED DESCRIPTION OF THE INVENTION

The novel products of this invention are prepared by reacting the appropriate 2-quinoxalinecarboxaldehyde-1,4-dioxide, the carbonyl component, with an active methylene nucleophile in a Knoevenagel-type condensation but without elimination of water from the condensation product. By "active methylene" nucleophile is meant a compound having a relatively acidic methylene group; that is, a methylene group linked to one and, preferably, two electron-withdrawing groups selected from the group consisting of -CN, -COCH$_3$, -CONR$_1$R$_2$, -CONH-(CH$_2$)$_n$-R$_3$ and -COOR$_4$ wherein $n$, R$_1$, R$_2$, R$_3$ and R$_4$ are as defined above.

The condensation is generally conducted in the presence of a reactioninert solvent; that is, a solvent which is not changed as a result of the reaction even though it may participate in the reaction in the role of a catalyst or in salt formation with a reactant or product.

The condensation can also be conducted "neat"; that is, in the absence of a solvent. However, it is advantageous, in most instances, to use a reaction-inert solvent to facilitate stirring, temperature control and recovery of products.

Suitable solvents are alkanols, such as methanol, ethanol, isopropanol, n-butanol and n-hexanol; chlorinated solvents such as methylene chloride, ethylene chloride, chloroform and carbon tetrachloride; pyridine; aromatic hydrocarbons such as benzene, toluene, xylene; hexane; nitromethane and ethyl acetate. Other solvents are found by simple experimentation. Methylene chloride is a preferred solvent especially when using triethylamine as catalyst because of the ease of separation and purity of products. A solvent system of piperidine and pyridine, the Doebner modification of the Knoevenagel condensation, is a preferred system because of the ease of reaction and satisfactory yields it affords.

A catalyst is often used to facilitate the condensation even when the nucleophiles possess two activating groups as do derivatives of malonic acid. Suitable catalysts are ammonia, primary, secondary and tertiary amines, such as n-butylamine, diethylamine, triethylamine, pyridine, piperidine, pyrrolidine, alkali metal fluorides, stannous fluoride, and basic ionexchange resins of the amine type, e.g., Amberlite IR-45 (a weakly basic polystyrene with polyamine groups; available from Rohm & Haas Co.) and De-Acidite G (polystyrene resin with diethylamino groups; available from the Permutit Co., Ltd., London).

The amount of catalyst used is not critical but can vary over a wide range; i.e., from about 0.1% to about 100% by weight based upon the 2-quinoxalinecarboxaldehyde 1,4-dioxide. The favored range of catalyst is from about 10% to about 30% by weight of the 2-quinoxalinecarboxaldehyde-1,4-dioxide.

The reaction is conducted at a temperature of from about 0° C. to about 50° C. and generally at about ambient temperature for periods of from about onefourth to five hours. The products generally separate from the reaction mixtures as solids and are recovered by filtration. Those which do not separate as solids are recovered by evaporation of the solvent or by pouring into a large volume of a non-solvent for the product.

The alkali metal, ammonium and amine salts of the compounds of this invention wherein X and/or Y is —COOH are prepared by neutralization of the acid derivative with the appropriate alkali metal hydroxide, bicarbonate or carbonate, or the appropriate amine or ammonium hydroxide. The reaction is generally conducted in water. Other solvents can, of course, be used and are frequently advantageous when preparing amine salts. The alkali metal salts are also prepared by treating the appropriate acid with an alkali metal alkoxide in an alcohol solvent.

The acid addition salts are readily obtained by treating the appropriate compound wherein $R_3$ is —$N(CH_3)_2$ with the desired acid in a suitable non-aqueous solvent, e.g., acetone, ethanol, isopropanol, diethyl ether.

The necessary 2-quinoxalinecarboxaldehyde-1,4-dioxide reactants wherein R is hydrogen are prepared by reacting the appropriate benzofuroxan with a dialkyl acetal of pyruvaldehyde and, preferably, with the dimethyl acetal of pyruvaldehyde in a reaction-inert solvent (acetonitrile) in the presence of a base such as pyrrolidine according to the process of British Specification No. 1,215,815.

The requisite 3-methyl-2-quinoxalinecarboxaldehyde-1,4-dioxide reactants are prepared from the corresponding 2-hydroxymethyl-3-methylquinoxaline-1,4-dioxides by a sequence of steps comprising: (a) reaction with hydrobromic acid to form a 2-bromethyl-3-methylquinoxaline-1,4-dioxide; and (b) oxidation of the bromo derivative with dimethylsulfoxide to produce the desired 2-carboxaldehyde compound. The 2-hydroxymethyl-3-methylenequinoxaline-1,4-dioxides are prepared by reacting the appropriate benzofuroxan with 4-hydroxy-2-butanone in a reaction-inert solvent, e.g., N,N-dimethylformamide, in the presence of pyrrolidine according to the procedure of British Specification No. 1,215,815.

The valuable products of this invention are remarkably effective in treating a wide variety of pathogenic microorganisms. They are, therefore, useful as industrial antimicrobials, for example, in water treatment, slimecontrol, paint preservation and wood preservation as well as for topical application purposes as disinfectants.

For in vitro use, e.g., for topical application, it will often be convenient to compound the selected product with a non-toxic carrier such as vegetable or mineral oil or an emollient cream. Similarly, they may be dissolved or dispersed in liquid carriers or solvents such as water, alcohol, glycols or mixtures thereof or other non-toxic inert media, that is, media which have no harmful effect on the active ingredient. For such purposes, it will generally be acceptable to employ concentrations of active ingredients of from abut 0.01 percent to about 10 percent by weight based on total composition.

Further, many of the compounds described herein exhibit broad spectrum activity, that is, activity against both gram-negative and gram-positive bacteria, such as *Escherichia coli*, *Salmonella cholerasuis*, *Staphylococcus aureus*, *Streptococcus pyrogens* and *Pasteurella multocida*. This is in contrast to the usual gram-negative activity of quinoxaline-di-N-oxides. Additionally, may of them are active in vivo and are especially useful as animal growth promotants, especially for swine and poultry.

When used in vivo for such purposes, these novel compounds can be administered orally or parenterally, e.g., by subcutaneous or intramuscular injection, at a dosage of from about 1 mg./kg. to about 100 mg./kg. of body weight. Vehicles suitable for parenteral injection may be either aqueous such as water, isotonic saline, isotonic dextrose, Ringer's solution, or nonaqueous such as fatty oils of vegetable origin (cotton seed, peanut oil, corn, sesame), dimethylsulfoxide, and other non-aqueous vehicles which will not interfere with therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. These compounds may also be combined with various pharmaceutically-acceptable inert carriers including solid diluents, aqueous vehicles, non-toxic organic solvents in the form of capsules, tablets, lozenges, troches, dry mixes, suspensions, solutions, elixirs and parenteral solutions or suspensions. In general, the compounds are used in various dosage forms at concentration levels ranging from about 0.5 percent to about 90 percent by weight of the total composition.

Other methods include mixing with animal feeds, the preparation of feed concentrates and supplements and dilute solutions or suspensions, e.g., a 0.1 percent solution, for drinking purposes. The addition of a low level of one or more of the herein described quinoxaline-1,4-dioxides to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improves feed efficiency (the number of pounds of feed required to produce a pound gain in weight). Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals, and other factors known to be required for the maximum healthy growth of such animals. The animals thus attain market size sooner and on less feed.

The herein described feed compositions have been found to be particularly valuable and outstanding in the case of swine. In some instances, the degree of response may vary with respect to the sex of the animals. The products may, of course, be administered in one component of the feed or they may be blended uniformly throughout a mixed feed; alternatively, as noted above, they may be administered in an equivalent amount via the animal's water ration. It should be noted that a variety of feed components may be of use in the nutritionally balanced feeds. Any animal feed composition may be prepared to comprise the usual nutritional balance of energy, proteins, minerals and vitamins together with one or more of the quinoxaline-1,4-dioxides described above. Some of the various components are commonly grains such as ground grain and grain by-products; animal protein substances, such as meat and fish by-products; vitaminaceous mixtures, e.g., vitamin A and D mixtures, riboflavin supplements and other vitamin B complexes; and bone meal, limestone and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers as to provide pre-mixes or concentrates which may readily be blended with standard nutritionally balanced feeds or which may be used themselves as an adjunct to normal feedings.

In the preparation of concentrates a wide variety of carriers, including the following: soybean oil meal, corn gluten meal, cotton seed oil meal, sunflower seed meal, linseed oil meal, cornmeal, limestone and corncob meal can be employed. The carrier facilitates uniform distribution of the active materials in the finished feed with which the concentrate is blended. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e., premixes, suitable for blending by feed manufacturers to produce finished feeds or concentrates of lower potency, the drug content may range from about 0.1 g. to 50 g. per pound of concentrate. The high potency concentrates may be blended by the feed manufacturer with proteinaceous carriers, such as soybean oil meal, to produce concentrated supplements which are suitable for direct feeding to animals. The proportion of the drug in these supplements may vary from about 0.1 to 10 g. per pound of supplement. A particularly useful concentrate is provided by blending 2 g. of drug with 1 pound of limestone or 1 pound of limestone-soybean oil meal (1:1). Other dietary supplements, such as vitamins, minerals, etc. may be added to the concentrates in the appropriate circumstances.

The concentrates described may also be added to animal feeds to produce a nutritionally balanced, finished feed containing from about 5 to about 200 g. of the herein described compounds per ton of finished feed. In the case of ruminants, the finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran and dried molasses. Bone meal, limestone, iodized salt and trace minerals are frequently added to supply the necessary minerals and urea to provide additional nitrogen.

As is well known to those skilled in the art, the type of diets are extremely variable depending upon the purpose, type of feeding operation, species, etc. Specific diets for various purposes are listed by Morrison in the Appendix of "Feeds and Feeding," the Morrison Publishing Company, Clinton, Iowa, 1959.

In the case of non-ruminant animals, such as hogs, a suitable feed may contain from about 50 to 80 percent of grains, 3 to 10 percent animal protein, 5 to 30 percent vegetable protein, 2 to 4 percent of minerals, together with supplementary vitaminaceous sources.

The in vitro antibacterial activity of several compounds within the scope of this invention against various organisms are presented below (Table I). The compounds are tested using an agar incorporation procedure utilizing anaerobic conditions achieved by the "Gas Pak" protocol (Baltimore Biological Laboratories, Baltimore, Md.).

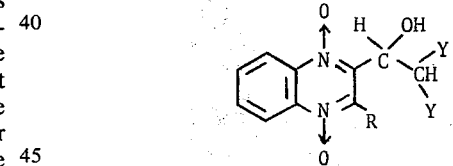

TABLE I.

| | | | IN VITRO ANTIBACTERIAL DATA MIC (mcg./ml.) | | | | | | |
|---|---|---|---|---|---|---|---|---|---|
| X | Y | R | S. aureus | S. pyogenes | E. coli | Salmonella typhosa | Klebsiella pneumoniae | Pasteurella multocida | Clostridium perfringens |
| CONH₂ | CONH₂ | CH₃ | 100 | 100 | 50 | 25 | 50 | 50 | <0.391 |
| CONH₂ | CONH₂ | H | 50 | 6.25 | 3.125 | 25 | 50 | 12.5 | 1.562 |
| CONH₂ | H | H | 3.125 | 12.5 | 3.125 | 6.25 | 3.125 | 6.25 | 6.25 |
| CONH(CH₃) | COOH⁽ᵃ⁾ | CH₃ | 100 | >200 | >200 | >200 | >200 | 12.5 | |
| COCH₃ | COCH₃ | CH₃ | 100 | 25 | 25 | 100 | 100 | 100 | 25 |
| COOC₂H₅ | COOC₂H₅ | CH₃ | 100 | 12.5 | 25 | 100 | 200 | 100 | 12.5 |
| COCH₃ | COCH₃ | H | 50 | 25 | 25 | 50 | 12.5 | 25 | 50 |
| CONH₂ | COOC₂H₅ | H | 25 | 25 | 12.5 | 25 | 25 | 50 | 25 |
| CONH₂ | COCH₃ | CH₃ | 100 | 25 | 25 | 50 | 6.25 | 25 | 6.25 |
| CONH₂ | COCH₃ | H | 25 | 25 | 6.25 | 25 | 100 | 50 | 1.562 |
| CONHCH₃ | CONHCH₃ | H | 25 | 50 | 3.125 | 6.25 | 100 | 50 | 12.5 |
| CONH(CH₂)₂OH | CONH(CH₂)₂OH | H | 100 | 50 | 50 | 50 | 200 | 200 | 200 |
| COOC₂H₅ | COCH₃⁽ᵇ⁾ | H | — | 200 | — | — | — | 200 | — |
| COOH | COOH | H | >200 | 200 | 100 | 200 | — | >200 | 50 |

⁽ᵃ⁾pyridine salt
⁽ᵇ⁾tested under aerobic conditions

In vivo antibacterial data are presented in Table II for several compounds of this application via the oral (PO) and subcutaneous (SQ) routes of administration. The values are obtained under standardized conditions. The procedure comprises production of an acute experimental *E. coli* 266 culture suspended in 5 percent hog gastric mucin. The test compounds are administered to infected mice by a multiple dosing regimen in which the first dose is given 0.5 hour after inoculation and is repeated 4, 24 and 48 hours later.

The percent of mice surviving after the last treatment are held for four days and the percent survivors then determined. The following values are thus obtained (Table II):

TABLE II.

| | | | IN VIVO DATA - PERCENT SURVIVORS | | | | | |
|---|---|---|---|---|---|---|---|---|
| | | | E. coli dose | | | Streptococcus pyogenes dose 02C203 | | |
| X | Y | R | (mg./kg.) | PO | SQ | (mg./kg.) | PO | SQ |
| $CONH_2$ | $CONH_2$ | H | 100 | — | 0 | 100 | 70 | 80 |
| $CONH_2$ | $CONH_2$ | H | | | | 50 | 40 | 50 |
| $CONH_2$ | $CONH_2$ | H | | | | 25 | 30 | 40 |
| $CONH_2$ | $CONH_2$ | H | | | | 12.5 | 20 | 30 |
| $CONH_2$ | $CONH_2$ | H | | | | 6.25 | 10 | 10 |
| $CONH_2$ | $CONH_2$ | $CH_3$ | 100 | — | 80 | 100 | 0 | 0 |
| $CONHCH_3$ | $CONHCH_3$ | H | 100 | 50 | 80 | | | |
| $CONHCH_3$ | $CONHCH_3$ | H | 50 | 40 | 50 | | | |
| $CONHCH_3$ | $CONHCH_3$ | H | 25 | 20 | 30 | | | |
| $CONHCH_3$ | $CONHCH_3$ | H | 12.5 | 10 | 20 | | | |
| $CONHCH_3$ | $CONHCH_3$ | H | 6.25 | 0 | 20 | | | |
| $CONHCH_3$ | $CONHCH_3$ | H | 3.12 | 0 | 20 | | | |
| $CONH_2$ | H | H | 100 | — | 10 | 100 | 60 | 50 |
| $CONHCH_3$ | $COOH^{(a)}$ | $CH_3$ | 100 | — | 0 | 100 | 20 | 20 |
| $COCH_3$ | $COCH_3$ | $CH_3$ | 100 | — | 90 | 100 | 10 | 0 |
| $COCH_3$ | $COCH_3$ | $CH_3$ | 50 | — | 20 | | | |
| $COCH_3$ | $COCH_3$ | $CH_3$ | 25 | — | 0 | | | |
| $COOC_2H_5$ | $COOC_2H_5$ | $CH_3$ | 100 | — | 10 | 100 | 0 | 0 |
| $CONH_2$ | H | $CH_3$ | 100 | — | 40 | 100 | 0 | 0 |
| $COOC_2H_5$ | $COCH_3$ | H | 100 | — | 0 | 100 | 0 | 0 |
| $COCH_3$ | $COCH_3$ | H | 100 | — | 30 | 100 | 10 | 0 |
| $CONH_2$ | $COOC_2H_5$ | H | 100 | — | 80 | 100 | 50 | 50 |
| $CONH_2$ | $COOC_2H_5$ | H | 50 | — | 50 | | | |
| $CONH_2$ | $COOC_2H_5$ | H | 25 | — | 10 | | | |
| $CONH_2$ | $COOC_2H_5$ | H | 12.5 | — | 0 | | | |
| $CONH_2$ | $COOC_2H_5$ | H | 6.25 | — | 0 | | | |
| $CONH(CH_2)_2OH$ | $CONH(CH_2)_2OH$ | H | 100 | — | 70 | $100^{(b)}$ | 80 | 80 |

$^{(a)}$pyridine salt
$^{(b)}$intravenous

EXAMPLE I

RS-2-(α-Hydroxy-2-Quinoxalinylmethyl)-Malonamide,$N^1$, $N^4$-Dioxide

A mixture of methanol (500 ml.), 2-quinoxalinecarboxaldehyde-1,4-dioxide (0.1 M) and malonamide (0.1 M) is heated to reflux on a streambath and piperidine (6 ml.) added. Heating is discontinued and the thick reaction mixture stirred at room temperature for one-half hour. The light yellow crystalline solid formed is separated by filtration and washed with methanol. It is then slurried in methanol, the slurry filtered and the solid dried. Yield = 7%. It is recrystallized from 2-methoxyethanol-water (1:1). M.P. 213°–214° C.

Analysis: Calcd. for $C_{12}H_{12}N_4O_5$: C, 49.31; H, 4.14; N, 19.71% Found: C, 49.30; H, 4.22; N, 18.20%

EXAMPLE II

Ethyl α-(RS)-Acetyl-β-(RS)-Hydroxy-2-Quinoxalinepropionate, $N^1$, $N^4$-Dioxide Ethyl acetoacetate (0.01 M) and 2-quinoxalinecarboxaldehyde-1,4-dioxide (0.01 M) are added to pyridine (20 ml.), cooled to 0°–5° C. The mixture is stirred for about one-half hour at which point a clear solution is obtained. The reaction mixture is chilled overnight and then evaporated to give an oil. Chloroform:ethylacetate (20 ml. of 1:1) is added and the solution stored in a refrigerator for five days. The bright yellow crystalline product formed is recovered by filtration (46% yield); M.P. 127°–130° C.

Analysis: Calcd. for $C_{15}H_{16}N_2O_6$: C, 56.25; H, 5.04; N, 8.75% Found: C, 56.61; H, 5.04; N, 8.78%

EXAMPLE III 3-(α-RS-Hydroxy-2-Quinoxalinylmethyl)-2,4-Pentanedione, $N^1$, $N^4$-Dioxide To pyridine (20 ml.) at 0°–5° C. is added 2-quinoxalinecarboxaldehyde-1,4-dioxide (0.01 M) and 2,4-pentanedione (0.01 M) under an atmosphere of nitrogen. The mixture is stirred for twenty-five minutes at which point a clear solution forms. It is chilled for two hours at 0°–5° C., and the yellow crystalline precipitate is filtered, washed with ether and dried. Yield: 87%; M.P. 162°–163° C.

Analysis: Calcd. for $C_{14}H_{14}N_2O_5$: C, 57.93; H, 4.86; N, 9.65% Found: C, 57.99; H, 4.85; N, 9.68%.

EXAMPLE IV

RS-2-(α-Hydroxy-2-Quinoxalinylmethyl)Malonamate, $N^1,N^4$-Dioxide

Piperidine (0.215 ml.) is added to a stirred mixture of 2-quinoxalinecarboxaldehyde-1,4-dioxide (0.01 M), malonamic acid (0.01 M) and pyridine (21.5 ml.) at room temperature. A temperature rise of 2° C. is noted and a clear solution results after approximately ten minutes stirring. The solution is stirred for an additional 1.75 hours and then poured into ether (100 ml.). The solid which forms is filtered and recrystallized from ethanol: ethyl acetate (55 ml. of 3:1). Yield: 61.5%, M.P. 142°–143° C. Its infrared spectrum indicates both amide and acid carbonyl groups are present.

EXAMPLE V

RS-β-Hydroxy-2-Quinoxalinepropionamide, $N^1$, $N^4$-Dioxide

The product of Example IV (1.8 g.) is decarboxylated by recrystallizing it from hot nitromethane. The decarboxylated product crystallizes upon chilling the solution and is recovered by filtration. Yield: 54.8%; M.P. 217°–218° C.

Analysis: Calcd. for $C_{11}H_{11}N_3O_4$: C, 53.01; H, 4.50; N, 16.86% Found: C, 52.56; H, 4.54; N, 16.83%.

EXAMPLE VI

α-(RS)-Acetyl-β-(RS)-Hydroxy-2-Quinoxalinepropionamide-$N^1,N^4$-Dioxide

Triethylamine (1.0 ml.) is added with stirring to a mixture of methylene chloride (50 ml.), 2-quinoxalinecarboxaldehyde-1,4-dioxide (0.01M) and acetoacetamide (0.01 M) at room temperature. The reaction mixture becomes thick almost immediately and after stirring for fifteen minutes is recovered by filtration. Yield = 86%; M.P. 161°–162° C.

Analysis: Calcd. for $C_{13}H_{12}N_3O_5$: C, 53.79; H, 4.17; N, 14.48% Found: C, 53.80; H, 4.71; N, 14.53%.

EXAMPLE VII

RS-2-(α-Hydroxy-3-Methyl-2-Quinoxalinylmethyl)-Malonamide,$N^1,N^4$-Dioxide Monohydrate A mixture of 3-methyl-2-quinoxalinecarboxaldehyde-1,4-dioxide (0.05 M), malonamide (0.05 M), pyridine (108 ml.) and piperidine (1.08 ml.) is stirred and heated at 65°–70° C. for one hour at which time a yellow solid begins to precipitate. The mixture is allowed to cool to room temperature, filtered, and the solid washed with chloroform and dried (5.17 g.). It is recrystallized from hot water (175 ml.) to give the hydrate. Yield: 12.5%; M.P. 215°–217° C.

Analysis: Calcd. for $C_{13}H_{14}N_4O_5 \cdot H_2O$: C, 48.14; H, 4.97; N, 17.28% Found: C, 47.72; H, 4.43; N, 18.54%.

EXAMPLE VIII

RS-β-Hydroxy-3-Methyl-2-Quinoxalinepropionamide, $N^1,N^4$-Dioxide

A mixture of pyridine (21.5 ml.), malonamic acid (0.01 M) and 3-methyl-2-quinoxalinecarboxaldehyde-1,4-dioxide (0.01 M) is stirred at room temperature for five days. The reaction mixture is filtered to remove some starting material. The filtrate is evaporated under reduced pressure and the residue washed with ether and then taken up in methanol. The methanol, which contains some suspended material, is filtered and the filtrate evaporated under reduced pressure. The residue is washed with ether and then treated with water (250 ml.). The aqueous mixture is filtered and the filtrate washed with chloroform (2 × 30 ml.) and then freeze-dried to give 1.7 g. (58.7%) of crude product. It is purified by recrystallization from hot ethanol-hexane (1:1). M.P. 195°–197° C.

Analysis: Calcd. for $C_{13}H_{11}N_3O_5$: C, 53.99; H, 3.84; N, 14.53% Found: C, 53.58; H, 4.96; N, 15.62%.

EXAMPLE IX

RS-2-(α-Hydroxy-2-Quinoxalinylmethyl)Malonic Acid,$N^1,N^4$-Dioxide

Malonic acid (0.01 M) and 2-quinoxalinecarboxaldehyde-1,4-dioxide (0.01 M) are added to pyridine (21.5 ml.) under a nitrogen atmosphere at 0°–5° C. The mixture is stirred for five hours at 0°–5° C., filtered and the filter cake washed with pyridine followed by ether. The solid is slurried with ethyl acetate several times (3 × 350 ml.) and dried. Yield: 54.4%; M.P. 128°–129° C. It is purified further by recrystallization from ethylene chloride-methanol (1:1). M.P. 132°–133° C.

Analysis: Calcd. for $C_{12}H_{10}N_2O_7$: C, 49.00; H, 3.41; N, 9.52% Found: C, 48.21; H, 3.73; N, 9.12%.

EXAMPLE X

RS-2-(α-Hydroxy-3-Methyl-2-Quinoxalinylmethyl)-Malonic Acid, $N^1,N^4$-Dioxide

Malonic acid (0.01 M), 3-methyl-2-quinoxalinecarboxaldehyde-1,4-dioxide (0.01 M) and pyridine (21.5 ml.) are stirred together under a nitrogen atmosphere at 0°–5° C. for five hours. The mixture is then filtered and the filter cake washed with pyridine, followed by ether. Addition of ether to the pyridine filtrate causes precipitation of the product which is separated by filtration and washed by repeated slurrying in chloroform. Yield: 11.6%; M.P. 117°–118° C.

The product is obtained as its pyridine salt.

Analysis: Calcd. for $C_{18}H_{15}N_3O_7$: C, 56.11; H, 3.93; N, 10.91% Found: C, 55.47; H, 4.48; N, 10.73%.

EXAMPLE XI

Ethyl RS-2-(α-Hydroxy-2-Quinoxalinylmethyl)Malonamate, $N^1,N^4$-Dioxide

Piperidine (0.5 ml.) is added to a mixture of 2-quinoxalinecarboxaldehyde-1,4-dioxide (0.01 M), ethyl malonamate (0.01 M) and methanol (100 ml.) with stirring. The mixture becomes very thick and after about twenty minutes is filtered, the solid is washed with methanol and dried. Yield: 2.37 g. (73.8%) of crude product. It is purified by recrystallization from 1,2-dimethoxyethane: M.P. 171°–172° C.

Analysis: Calcd. for $C_{14}H_{15}N_3O_6$: C, 52.34; H, 4.71; N, 13.08% Found: C, 51.73; H, 4.67; N, 12.97%.

EXAMPLE XII

2-RS-(α-Hydroxy-2-Quinoxalinylmethyl)Malonamide N,N'-Bis-(2-Hydroxyethyl), $N^1$, $N^4$-Dioxide To a mixture of 2-quinoxalinecarboxaldehyde-1,4-dioxide (0.01 M), N,N'-bis-(2-hydroxyethyl)malonamide (0.01 M) and methanol (100 ml.) is added piperidine (0.5 ml.) with stirring at room temperature. A clear solution results from which the product precipitates within approximately five minutes. The mixture is stirred an additional ten minutes and then filtered. The filter cake is washed with methanol and dried. Yield: 68.4%, M.P. 172°–173° C.

Analysis: Calcd. for $C_{16}H_{20}N_4O_7$: C, 50.52; H, 5.30; N, 14.72% Found: C, 49.60; H, 5.31; N, 14.39%.

EXAMPLE XIII 3-(α-Hydroxy-3-Methyl-2-Quinoxalinylmethyl)-2,4-Pentanedione, $N^1,N^4$-Dioxide A mixture of pyridine (20 ml.), 2,4-pentanedione (0.02 M) and 3-methyl-2-quinoxalinecarboxaldehyde-1,4-dioxide (0.02 M) is stirred at room temperature for 90 minutes. (The mixture becomes very thick within a few minutes.) It is poured into ether (100 ml.), the mixture stirred and then filtered (4.03 g.); M.P. 154°–155° C. It is recrystallized from hot benzene.

Yield: 37.8%; M.P. 158°–160° C.

Analysis: Calcd. for $C_{15}H_{16}N_2O_5$: C, 59.20; H, 5.30; N, 9.21% Found: C, 59.31; H, 5.39; N, 8.73%.

EXAMPLE XIV

RS-Diethyl-2-(α-Hydroxy-3-Methyl-2-Quinoxalinylmethyl)Malonate, $N^1,N^4$-Dioxide A mixture of diethyl malonate (0.02 M), 3-methyl-2-quinoxalinecarboxaldehyde-1,4-dioxide (0.02 M) and pyridine (20 ml.) is stirred under an atmosphere of nitrogen for two hours at room temperature. To the clear solution which forms is added a solution of methanol-ether (150 ml. of 1:1) and stirring continued under nitrogen. The product which precipitates is filtered, washed with methanol-ether and dried. Yield 23.2%. M.P. after recrystallization from benzene-hexane (1:1) = 117°–118° C.

Analysis: Calcd. for $C_{17}H_{20}N_2O_7$: C, 56.04; H, 5.53; N, 7.68% Found: C, 56.02; H, 5.48; N, 7.34%.

EXAMPLE XV

2-RS-(α-Hydroxy-2-Quinoxalinylmethyl)Malonamide N,N'-Dimethyl, $N^1,N^4$-Dioxide Piperidine (0.75 ml.) is added with stirring to a mixture of N,N'-dimethylmalonamide (0.01 M), 2-quinoxalinecarboxaldehyde-1,4-dioxide (0.01 M) and methanol (100 ml.) at room temperature. A precipitate forms immediately and after twenty minutes is filtered, washed with methanol and dried. Yield 31.3%. M.P. 201°–202° C.

Analysis: Calcd. for $C_{14}H_{16}N_4O_5$: C, 52.49; H, 5.03; N, 17.49%. Found: C, 51.72; H, 4.94; N, 17.29%.

EXAMPLE XVI

β-Hydroxy-3-Methyl-α-(Methylcarbamoyl)-2Quinoxalinepropionic Acid, $N^1$, $N^4$-Dioxide, Piperidine Salt Piperidine (0.5 ml.) is added with stirring to a mixture of 3-methyl-2-quinoxalinecarboxaldehyde-1,4-dioxide (0.01 M), N-methylmalonamic acid (0.01 M) and pyridine (20 ml.) at room temperature. The mixture is stirred overnight and then poured into ether (500 ml.). Crystals form immediately and the mixture is stirred for a half-hour and then filtered. The crystals are washed with ether and dried. The crude product is purified by dissolving in methanol (100 ml.) and reprecipitating by pouring the methanol solution into ether (1500 ml.). The precipitate is filtered, washed with ether and dried. Yield 50%; M.P. 152°–153° C. as the piperidine salt. Recrystallization of the product from ethanol raises the melting point to 156°–157° C.

Analysis: Calcd. for $C_{19}H_{26}N_4O_6$: C, 56.15; H, 6.46; N, 13.79% Found: C, 55.86; H, 6.40; N, 13.75%.

EXAMPLE XVII

3-Methyl-α-(RS)-Acetyl-β-(RS)-Hydroxy-2-Quinoxaline Propionamide, $N^1,N^4$-Dioxide A mixture of methylene chloride (50 ml.), 3-methyl-2-quinoxalinecarboxaldehyde-1,4-dioxide (0.01 M), acetoacetamide (0.01 M) and triethylamine (1 ml.) is stirred for 2.5 hours at room temperature. It is then filtered, washed with methylene chloride and dried. Yield 73.6%; M.P. 158°–160° C.

Analysis: Calcd. for $C_{17}H_{14}N_3O_5$: C, 55.26; H, 4.64; N, 13.81% Found: C, 54.16; H, 4.66; N, 13.88%.

The nuclear magnetic resonance spectra of the products of Examples I-XVII are consistent with the assigned structures.

EXAMPLE XVIII

The following compounds are prepared from the appropriate 2-quinoxalinecarboxaldehyde and the appropriate nucleophile X—CH₂—Y according to the procedure of Example XVII.

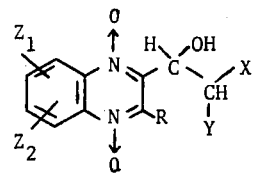

| $Z_1$ | $Z_2$ | X | Y | R |
|---|---|---|---|---|
| H | H | CN | CN | H |
| H | H | CN | CN | $CH_3$ |
| Cl | H | $CONH_2$ | $CONH_2$ | H |
| Cl | H | $CONH_2$ | H | H |
| Cl | H | $COCH_3$ | $COCH_3$ | $CH_3$ |
| Cl | H | COOH | COOH | $CH_3$ |
| Cl | H | $COOC_2H_5$ | $COCH_3$ | H |
| Cl | H | $CONH(CH_2)_3OH$ | $CONH(CH_2)_3OH$ | $CH_3$ |
| Cl | H | $CONH(CH_2)N(CH_3)_2$ | H | H |
| Cl | H | $CON(CH_3)_2$ | $CON(CH_3)_2$ | H |
| Cl | H | $CONHC_2H_5$ | COOH | $CH_3$ |
| $CH_3$ | H | CN | CN | $CH_3$ |
| $CH_3$ | H | COOH | $CONH_2$ | H |
| $CH_3$ | H | $CONH_2$ | H | $CH_3$ |
| $CH_3$ | H | $COOCH_3$ | $COCH_3$ | H |
| $CH_3$ | H | $CONH(CH_2)_3N(CH_3)_2$ | $CONH(CH_2)_3N(CH_3)_2$ | $CH_3$ |
| $OCH_3$ | H | COOH | $CONH_2$ | $CH_3$ |
| $OCH_3$ | H | CN | CN | H |
| $OCH_3$ | H | $COCH_3$ | $COCH_3$ | $CH_3$ |
| $OCH_3$ | H | $CONH(CH_2)_2OH$ | $CONH(CH_2)_2OH$ | H |
| $OCH_3$ | H | CN | $COCH_3$ | $CH_3$ |
| $OCH_3$ | H | CN | $COOCH_3$ | $CH_3$ |
| $OCH_3$ | H | $CONHC_2H_5$ | $CONHC_2H_5$ | $CH_3$ |
| $SO_2NH_2$ | H | $CONH_2$ | $CONH_2$ | H |
| $SO_2NH_2$ | H | $CONHCH_3$ | $CONHCH_3$ | H |
| $CO_2NH_2$ | H | $COCH_3$ | CN | $CH_3$ |
| $SO_2NH_2$ | H | $CONH_2$ | $COOCH_2$ | H |
| $SO_2NH_2$ | H | $CONH(CH_2)_2N(CH_3)_2$ | $CONH(CH_2)_2N(CH_3)_2$ | CH |
| $SO_2NH_2$ | H | COOH | COOH | H |
| $SO_2NH_2$ | H | $COCH_3$ | $CONH_2$ | $CH_3$ |
| $SO_2NH(CH_3)$ | H | $CONH_2$ | $CONH_2$ | H |
| $SO_2NH(CH_3)$ | H | COOH | H | H |

-continued

| $Z_1$ | $Z_2$ | X | Y | R |
|---|---|---|---|---|
| $SO_2NH(CH_3)$ | H | $COCH_3$ | COOH | H |
| $SO_2NH(CH_3)$ | H | $CONHCH_3$ | $CONHCH_3$ | H |
| $SO_2N(CH_3)_2$ | H | $COCH_3$ | CN | H |
| $SO_2N(CH_3)_2$ | H | $CONH_2$ | CN | $CH_3$ |
| $SO_2N(CH_3)_2$ | H | $CONHC_2H_5$ | $COCH_3$ | $CH_3$ |
| $SO_2N(CH_3)_2$ | H | $CONH_2$ | $CONH_2$ | H |
| Cl | Cl | $CONH_2$ | $CONH_2$ | H |
| Cl | Cl | $COOCH_3$ | $COOCH_3$ | H |
| Cl | Cl | CN | CN | $CH_3$ |
| Cl | Cl | $CONH_2$ | H | $CH_3$ |
| Cl | Cl | COOH | COOH | H |
| Cl | Cl | $CONH(CH_2)_3OH$ | $CONH(CH_2)_3OH$ | H |
| $CH_3$ | $CH_3$ | $CON(C_2H_5)_2$ | COOH | $CH_3$ |
| $CH_3$ | $CH_3$ | $CONH(CH_2)_2N(CH_3)_2$ | $CONH(CH_2)_2N(CH_3)_2$ | H |
| $CH_3$ | $CH_3$ | $COOCH_3$ | $COOCH_3$ | $CH_3$ |
| $CH_3$ | $CH_3$ | $COOC_2H_5$ | $CONH_2$ | $CH_3$ |
| $CH_3$ | $CH_3$ | $CONH_2$ | $CONH_2$ | H |
| $CH_3$ | H | $CONH_2$ | $CONH_2$ | H |
| $OCH_3$ | H | $CONH_2$ | $CONH_2$ | H |

EXAMPLE XIX

Acid addition salts of the compounds of this invention wherein X and/or Y is —$CONH(CH_2)_n$—$N(CH_3)_2$ are prepared by adding a stoichiometric amount of the appropriate acid to a solution of the aldol product having such a basic group, stirring the mixture for about a half-hour at from about 20° to 50° C., and recovering the salt by suitable means; e.g., by chilling to precipitate the salt or by evaporation of the solvent. Suitable solvents are readily determined by experiment and include methanol, ethanol, chloroform and benzene.

In this manner, the hydrochloride, sulfate, nitrate, phosphate, pamoate, amsonate, citrate, succinate, oxalate, tartrate, acetate, butyrate, p-toluenesulfonate and stearate are formed.

EXAMPLE XX

Alkali metal, ammonium and amine salts of those compounds of this invention wherein at least one of X and Y is —COOH are prepared by treating a solution or suspension of the appropriate aldol product with the appropriate base. For production of alkali metal salts, water and lower alkanols (methanol, ethanol, isopropanol) are favored as solvent media and sodium or potassium hydroxide or sodium or potassium alcoholates as bases.

For production of ammonium and amine salts, lower alkanols, chloroform, benzene and acetone (for tertiary amines) are useful solvents.

The products are recovered by filtration, precipitation with a non-solvent or by evaporation of the solvent.

In this manner, the sodium, potassium, ammonium, pyridine, triethylamine, tri-n-butylamine, N-methylaniline, piperidine, cyclohexylamine and octylamine salts are formed.

PREPARATION A

6-(or 7)-Substituted and 6,7-Disubstituted-3-Methyl-2-Quinoxalinemethanol-1,4-Dioxides A mixture of the appropriate 5- or 5,6-substituted benzofuran (0.1M), 4-hydroxy-2-butanone (0.15 M), pyrrolidine (0.025 M) and N, N-dimethylformamide (20 ml.) is stirred at room temperature for 3 hours. The solid which precipitates is filtered off, washed with acetonitrile and dried to provide the product. (If the product does not precipitate, the reaction mixture is evaporated under reduced pressure and the residue triturated under ether.)

The following compounds are thus prepared:

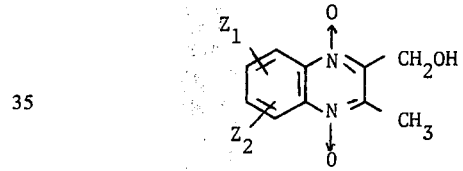

| $Z_1$ | $Z_2$ |
|---|---|
| Cl | H |
| $CH_3$ | H |
| $OCH_3$ | H |
| $SO_2NH_2$ | H |
| $SO_2NH(CH_3)$ | H |
| $SO_2N(CH_3)_2$ | H |
| Cl | Cl |
| $CH_3$ | $CH_3$ |

PREPARATION B

6-(or 7)-Substituted and 6,7-Disubstituted-2-Bromomethyl-3-Methylquinoxaline-1,4-Dioxides A solution of the appropriate 6-(or 7)-substituted or 6,7-disubstituted-3-methyl-2-quinoxalinemethanol-1,4-dioxide (0.1 M) and 48% aqueous hydrobromic acid (150 ml.) is warmed to 90° C. After an hour the solution is allowed to cool to room temperature, and is evaporated under reduced pressure to furnish the essentially pure 6-(or 7)-substituted or 6,7-disubstituted-2-bromomethyl-3-methylquinoxaline-1,4-dioxide which is used without further purification. In certain cases the product crystallizes directly from the reaction solution. If the substituted 3-methyl-2-quinoxalinemethanol-1,4-dioxide does not form a solution with 48% aqueous hydrobromic acid, solution is obtained by using 30% hydrogen bromide in acetic acid.

PREPARATION C

6-(or 7)-Substituted and 6,7-Disubstituted-3-Methyl-2-Quinoxalinecarboxaldehyde-1,4-Dioxides A suspension of the appropriate 6-(or 7)-substituted or 6,7-disubstituted 2-bromomethyl-3-methylquinoxaline-1,4-dioxide (0.1 M), acetonitrile (200 ml.) and dimethylsulfoxide (50 ml.) is heated under reflux for 30 minutes. Dimethylsulfide evolves. After the reaction subsides, the mixture is cooled to room temperature and the aldehyde product filtered. It is used without further purification.

The compounds listed below are prepared from compounds of Preparation A by the procedures of Preparations B and C.

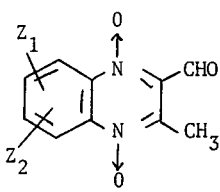

| $Z_1$ | $Z_2$ |
|---|---|
| Cl | H |
| $CH_3$ | H |
| $OCH_3$ | H |
| $SO_2NH_2$ | H |
| $SO_2NH(CH_3)$ | H |
| $SO_2N(CH_3)_2$ | H |
| Cl | Cl |
| $CH_3$ | $CH_3$ |

PREPARATION D

6-(or 7)-Substituted and 6,7-Disubstituted-2-Quinoxalinemethanol-1,4-Dioxides Pyrrolidine (0.05 M) is added with stirring to a mixture of the appropriate benzofuroxan (0.1 M), pyruvaldehyde dimethylacetal (0.1 M) and acetonitrile (100 ml.). The mixture is allowed to stand overnight at room temperature and is then evaporated to dryness in vacuo. The residue is taken up in concentrated hydrochloric acid (25 ml.), the mixture diluted with water and then extracted with chloroform. The extract is dried ($Na_2SO_4$) and stripped of chloroform to give the desired product which is used as is or, if desired, is purified by crystallization from an appropriate solvent system; e.g., chloroform-hexane.

The following compounds are thus prepared:

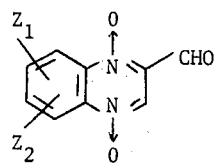

| $Z_1$ | $Z_2$ | $Z_1$ | $Z_2$ |
|---|---|---|---|
| Cl | H | $SO_2N(CH_3)_2$ | H |
| $CH_3$ | H | Cl | Cl |
| $OCH_3$ | H | $CH_3$ | $CH_3$ |

-continued

| $Z_1$ | $Z_2$ | $Z_1$ | $Z_2$ |
|---|---|---|---|
| $SO_2NH_2$ | H | | |
| $SO_2NH(CH_3)$ | H | | |

The benzofuroxan reactants not previously described in the literature are prepared by the general method described by Smith and Boyer, Org. Synth. 1963, Coll. Vol. IV, p. 75. The method comprises converting the appropriately substituted o-nitroaniline to the corresponding nitrophenylazide and, subsequently, decomposing the azide to the desired benzofuroxan compound.

PREPARATION E

Following the procedures of Preparations B–C, the compounds listed below are prepared from the products of Preparation D.

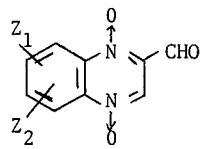

| $Z_1$ | $Z_2$ |
|---|---|
| Cl | H |
| $CH_3$ | H |
| $OCH_3$ | H |
| $SO_2NH_2$ | H |
| $SO_2NH(CH_3)$ | H |
| $SO_2N(CH_3)_2$ | H |
| Cl | Cl |
| $CH_3$ | $CH_3$ |

What is claimed is:
1. A compound of the formula

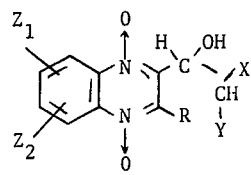

wherein
R is selected from the group consisting of hydrogen and methyl;
X is selected from the group consisting of —CN, —$COCH_3$, —$CONR_1R_2$, —CONH—$(CH_2)_n$—$R_3$ and —$COOR_4$;
Y is selected from the group consisting of hydrogen and X;
each of $R_1$, $R_2$ and $R_4$ is selected from the group consisting of hydrogen, methyl and ethyl;
$R_3$ is selected from the group consisting of —OH and —$N(CH_3)_2$;
n is 2 or 3;
$Z_1$ is a 6- or 7-position substituent and is selected from the group consisting of H, —Cl, —$CH_3$—, $OCH_2$, —$SO_2NH_2$, —$SO_2NH(CH_3)$ and —$SO_2N(CH_3)_2$;

$Z_2$ is a 7- or 6-position substituent and is selected from the group consisting of H, —Cl and —CH$_3$; with the proviso that when $z_2$ is —Cl or —CH$_3$, $Z_1$ is also —Cl or —CH$_3$;

and the pharmaceutically acceptable alkali metal, ammonium and amine salts of those compounds wherein at least one of X and Y is —COOH;

and the pharmaceutically acceptable acid addition salts of these compounds wherein $R_3$ is —N(CH$_3$)$_2$.

2. A compound according to claim 1 wherein each of $Z_1$ and $Z_2$ is hydrogen and R is methyl.

3. A compound according to claim 1 wherein each of $Z_1$, $Z_2$ and R is hydrogen.

4. A compound according to claim 1 wherein each of X and Y is —CONH(CH$_2$)$_n$—R$_3$ wherein $n$ is 2 and R$_3$ is OH; and each of $Z_1$, $Z_2$ and R is hydrogen.

5. A compound according to claim 1 wherein X is —CONR$_1$R$_2$; Y is —COOR$_4$ and each of $Z_1$, $Z_2$ and R is hydrogen.

6. A compound according to claim 2 wherein each of X and Y is —CONR$_1$R$_2$; R is methyl and each of $Z_1$ and $Z_2$ is hydrogen.

7. A compound according to claim 3 wherein each of X and Y is —CONR$_1$R$_2$; and each of R, $Z_1$ and $Z_2$ is hydrogen.

8. A compound according to claim 5 wherein each of R$_1$ and R$_2$ is hydrogen; and R$_4$ is ethyl.

9. A compound according to claim 6 wherein each of R$_1$ and R$_2$ is hydrogen.

10. A compound according to claim 7 wherein each of R$_1$ and R$_2$ is hydrogen.

* * * * *

UNITED STATES PATENT AND TRADEMARK OFFICE
CERTIFICATE OF CORRECTION

PATENT NO. : 3,926,992
DATED : December 16, 1975
INVENTOR(S) : James W. Mc Farland It is certified that error appears in the above-identified patent and that said Letters Patent are hereby corrected as shown below:

Col. 6, line 53, "12.5" should read -- >200 --;

line 53, the blank under heading "Clostridium perfringens" should read -- 12.5 --.

Col. 7, line 54, "7%" should read -- 77% --.

Col. 13, line 64, "benzofuran" should read -- benzofuroxan --.

Col. 16, line 67, "$OCH_2$" should read -- $OCH_3$ --.

Signed and Sealed this twenty-third Day of March 1976

[SEAL]

Attest:

RUTH C. MASON
Attesting Officer

C. MARSHALL DANN
Commissioner of Patents and Trademarks